United States Patent
Liu et al.

(10) Patent No.: US 11,927,851 B2
(45) Date of Patent: Mar. 12, 2024

(54) DISPLAY PANEL AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Hao Liu, Beijing (CN); Ruichen Zhang, Beijing (CN); Kaixuan Wang, Beijing (CN); Yanqing Chen, Beijing (CN); Zhao Zhang, Beijing (CN); Yanni Liu, Beijing (CN); Li Tian, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 111 days.

(21) Appl. No.: 17/606,581

(22) PCT Filed: Jan. 18, 2021

(86) PCT No.: PCT/CN2021/072434
§ 371 (c)(1),
(2) Date: Oct. 26, 2021

(87) PCT Pub. No.: WO2022/151466
PCT Pub. Date: Jul. 21, 2022

(65) Prior Publication Data
US 2023/0138896 A1 May 4, 2023

(51) Int. Cl.
*G02F 1/13363* (2006.01)
*G02F 1/1335* (2006.01)
(Continued)

(52) U.S. Cl.
CPC .. *G02F 1/133638* (2021.01); *G02F 1/133504* (2013.01); *G02F 1/133531* (2021.01);
(Continued)

(58) Field of Classification Search
CPC ......... G02F 1/133638; G02F 1/133531; G02F 1/133504; G02F 1/133553; G02F 1/1337;
(Continued)

(56) References Cited

U.S. PATENT DOCUMENTS 6,433,845 B1   8/2002   Suzuki et al.
7,405,787 B2   7/2008   Paukshto et al.
(Continued)

FOREIGN PATENT DOCUMENTS

CM   105629580 A   6/2016
CN   1729410 A    2/2006
(Continued)

*Primary Examiner* — Edward J Glick
*Assistant Examiner* — William D Peterson
(74) *Attorney, Agent, or Firm* — Dilworth & Barrese, LLP.; Michael J. Musella, Esq.

(57) ABSTRACT

A display panel and a display device are provided. The display panel includes a first base substrate; a second base substrate opposite to the first base substrate; a liquid crystal layer between the first and second base substrates; a first alignment film at a side of the first base substrate facing the liquid crystal layer; a second alignment film at a side of the second base substrate facing the liquid crystal layer; a polarizer at a side of the first base substrate away from the liquid crystal layer; and a quarter-wave plate between the polarizer and the first base substrate. An angle between a center line of an included angle between the first alignment direction of the first alignment film and the second alignment direction of the second alignment film and a slow axis of the quarter-wave plate is in a range from 75 to 105 degrees.

17 Claims, 12 Drawing Sheets

(51) Int. Cl.
*G02F 1/1337* (2006.01)
*G09G 3/36* (2006.01)
*G02F 1/139* (2006.01)

(52) U.S. Cl.
CPC ...... *G02F 1/133553* (2013.01); *G02F 1/1337* (2013.01); *G09G 3/36* (2013.01); *G02F 1/1396* (2013.01); *G02F 2203/02* (2013.01); *G02F 2203/66* (2013.01); *G02F 2413/02* (2013.01); *G02F 2413/06* (2013.01); *G02F 2413/08* (2013.01); *G09G 2330/02* (2013.01)

(58) Field of Classification Search
CPC ............... G02F 1/1396; G02F 2203/02; G02F 2203/66; G02F 2413/02; G02F 2413/06; G09G 3/36; G09G 2330/02
USPC .......................................................... 349/33
See application file for complete search history.

(56) References Cited

U.S. PATENT DOCUMENTS

| | | | |
|---|---|---|---|
| 7,833,588 B2 | 11/2010 | Mikoshiba et al. | |
| 9,588,271 B2 | 3/2017 | Yamada et al. | |
| 9,857,623 B2 | 1/2018 | Zhong et al. | |
| 2006/0055856 A1 | 3/2006 | Tashiro et al. | |
| 2014/0204296 A1* | 7/2014 | Mitsui | G02F 1/134336 349/33 |
| 2017/0371191 A1 | 12/2017 | Zhong | |

FOREIGN PATENT DOCUMENTS

| | | |
|---|---|---|
| CN | 1777837 A | 5/2006 |
| CN | 1924666 A | 3/2007 |
| CN | 101576685 A | 11/2009 |
| CN | 102890362 A | 1/2013 |
| CN | 104170525 A | 11/2014 |
| CN | 104614891 A | 5/2015 |
| CN | 109212843 A | 1/2019 |
| CN | 111474777 A | 7/2020 |
| CN | 212276162 U | 1/2021 |
| JP | 11183723 A | 7/1999 |
| JP | 2000171788 A | 6/2000 |
| JP | 2001027755 A | 1/2001 |
| JP | 2007114478 A | 5/2007 |
| JP | 2020170147 A | 10/2020 |
| TW | M545991 U | 7/2017 |
| TW | M600855 U | 9/2020 |
| TW | M600855 U * | 9/2020 |

* cited by examiner

DISPLAY PANEL AND DISPLAY DEVICE

TECHNICAL FIELD

Embodiments of the present disclosure relate to a display panel and a display device.

BACKGROUND

The contrast ratio of common reflective display device is low, which affects the display effect and is not conducive to improving user's experience.

SUMMARY

At least one embodiment of the disclosure provides a display panel and a display device.

At least one embodiment of the disclosure provides a display panel, comprising: a first base substrate; a second base substrate, arranged opposite to the first base substrate; a liquid crystal layer, located between the first base substrate and the second base substrate; a first alignment film, located at a side of the first base substrate facing the liquid crystal layer; a second alignment film, located at a side of the second base substrate facing the liquid crystal layer; a polarizer, located at a side of the first base substrate away from the liquid crystal layer; and a quarter-wave plate, located between the polarizer and the first base substrate, wherein the first alignment film has a first alignment direction, and the second alignment film has a second alignment direction, an angle between a center line of an included angle between the first alignment direction and the second alignment direction and a slow axis of the quarter-wave plate is in a range from 75 to 105 degrees.

For example, the display panel provided by an embodiment of the disclosure further comprises: a scattering film, wherein the scattering film is configured to scatter light incident thereon.

For example, the display panel provided by an embodiment of the disclosure further comprises: a half-wave plate located between the polarizer and the quarter-wave plate, wherein an included angle between a polarization direction of light emitted from the half-wave plate and the slow axis of the quarter-wave plate is in a range from 40 to 50 degrees.

For example, in the display panel provided by an embodiment of the disclosure, an included angle between a transmission axis of the polarizer and a slow axis of the half-wave plate is in a range from 5 to 25 degrees or a range from 60 to 80 degrees.

For example, in the display panel provided by an embodiment of the disclosure, the liquid crystal layer serves as a quarter-wave plate, and an included angle between a slow axis of the liquid crystal layer and the slow axis of the quarter-wave plate is in a range from 75 to 105 degrees.

For example, in the display panel provided by an embodiment of the disclosure, an included angle between the first alignment direction and the second alignment direction is in a range from 48 to 58 degrees, or a range from 71 to 81 degrees.

For example, in the display panel provided by an embodiment of the disclosure, the scattering film is located at a side of the first base substrate away from the liquid crystal layer.

For example, in the display panel provided by an embodiment of the disclosure, the scattering film is located between the quarter-wave plate and the first base substrate.

For example, in the display panel provided by an embodiment of the disclosure, the scattering film comprises a plurality of scattering units, each of the plurality of scattering units comprises a rod-like shape, and each of the plurality of scattering units comprises a first portion; an included angle between the first portion and the first base substrate is an acute angle, and an extending direction of the first portion is the same as a direction in which a reflectivity of the display panel is maximum without the scattering film.

For example, in the display panel provided by an embodiment of the disclosure, each of the plurality of scattering units further comprises a second portion, and an included angle between the first portion and the second portion is greater than 90 degrees and less than 180 degrees.

For example, in the display panel provided by an embodiment of the disclosure, the first portion is closer to the first base substrate than the second portion, and an included angle between the second portion and the first base substrate is larger than the included angle between the first portion and the first base substrate.

For example, in the display panel provided by an embodiment of the disclosure, the included angle between the second portion and the first base substrate is an acute angle or a right angle.

For example, in the display panel provided by an embodiment of the disclosure, the acute angle is greater than 0 degree and less than or equal to 15 degrees.

For example, in the display panel provided by an embodiment of the disclosure, the scattering film comprises a scattering structure and a reflective element, the scattering structure and the reflective element are located on the second base substrate, the scattering structure comprises a plurality of protrusions and recessed portions located between adjacent ones of the plurality of protrusions, the scattering structure is located at a side of the second base substrate facing the first base substrate, and the reflective element is located at a side of the scattering structure away from the second base substrate, and is conformally formed on a surface of the scattering structure away from the second base substrate.

For example, the display panel provided by an embodiment of the disclosure further comprises: a reflective element, wherein the reflective element is located at a side of the second base substrate facing the liquid crystal layer, and the reflective element is configured to reflect light incident thereon.

For example, the display panel provided by an embodiment of the disclosure further comprises a first electrode on the first base substrate and a second electrode on the second base substrate, wherein the first electrode and the second electrode are configured to form an electric field to drive liquid crystal molecules in the liquid crystal layer to rotate.

For example, in the display panel provided by an embodiment of the disclosure, the second electrode is also used as the reflective element.

At least one embodiment of the disclosure provides a display device, comprising the display panel according to any one of items as mentioned above.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
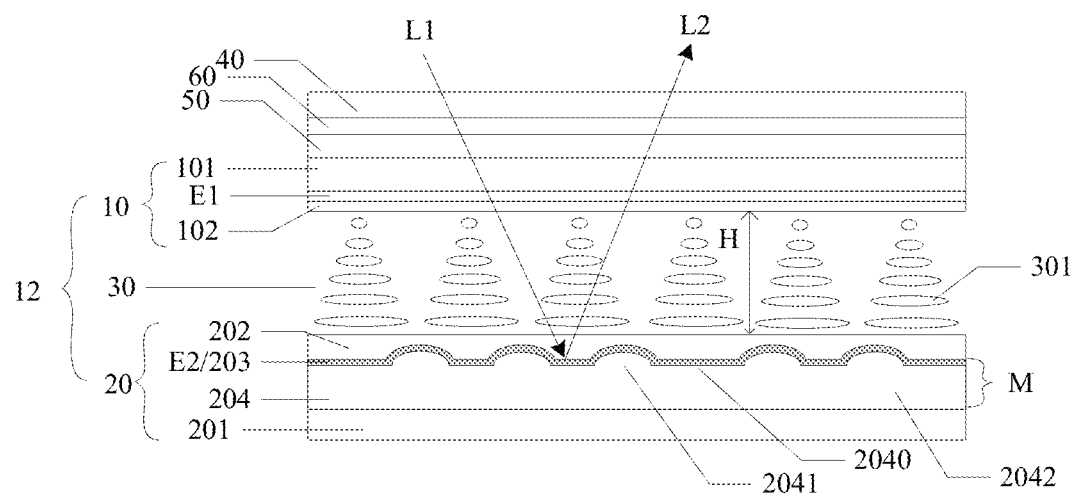
FIG. 1 is a schematic diagram of a display panel, which is powered off, provided by an embodiment of the present disclosure.

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise specified, the technical terms or scientific terms used in the disclosure have normal meanings understood by those skilled in the art. The words "first", "second" and the like used in the disclosure do not indicate the sequence, the number or the importance but are only used for distinguishing different components. The word "comprise", "include" or the like only indicates that an element or a component before the word contains elements or components listed after the word and equivalents thereof, not excluding other elements or components. The words "connection", "connected" and the like are not limited to physical or mechanical connection but may include electrical connection, either directly or indirectly. The words "on", "beneath", "left", "right" and the like only indicate the relative position relationship which is correspondingly changed when the absolute position of a described object is changed.

At least one embodiment of the present disclosure provides a display panel including a first base substrate; a second base substrate, arranged opposite to the first base substrate; a liquid crystal layer, located between the first base substrate and the second base substrate; a first alignment film, located at a side of the first base substrate facing the liquid crystal layer; a second alignment film, located at a side of the second base substrate facing the liquid crystal layer; a polarizer, located at a side of the first base substrate away from the liquid crystal layer; and a quarter-wave plate, located between the polarizer and the first base substrate. The first alignment film includes a first alignment direction, and the second alignment film includes a second alignment direction, and an included angle between a slow axis of the quarter-wave plate and a center line of an included angle between the first alignment direction and the second alignment direction is in the range from 75 to 105 degrees.

According to the display panel provided by the at least one embodiment of the present disclosure, the included angle between the slow axis of the quarter-wave plate and the center line of the included angle between the first alignment direction and the second alignment direction is set in the range from 75 to 105 degrees, thereby improving the contrast ratio (CR) of the display panel. For example, in the embodiment of the present disclosure, the contrast ratio refers to a ratio of reflectivity in a white state (maximum brightness) to reflectivity in a black state (minimum brightness). The higher the contrast ratio, the better the display effect of the display panel.

FIG. 1 is a schematic diagram of a display panel, which is powered off, provided by an embodiment of the present disclosure. As illustrated by FIG. 1, the display panel includes a first base substrate 101, a second base substrate 201, a liquid crystal layer (LCL) 30, a first alignment film 102, a second alignment film 202, a polarizer (POL) 40, and a quarter-wave plate (λ/4) 50. The second base substrate 201 is arranged opposite to the first base substrate 101. The liquid crystal layer 30 is located between the first base substrate 101 and the second base substrate 201. The first alignment film 102 is located at a side of the first base substrate 101 facing the liquid crystal layer 30. The second alignment film 202 is located at a side of the second base substrate 201 facing the liquid crystal layer 30. The polarizer 40 is located at a side of the first base substrate 101 away from the liquid crystal layer 30. The quarter-wave plate 50 is located between the polarizer 40 and the first base substrate 101.

For example, as illustrated by FIG. 1, the display panel further includes a half-wave plate (λ/2) 60 located between the polarizer 40 and the quarter-wave plate 50. For example, the half-wave plate 60 can rotate the polarization direction of polarized light incident thereon. The function of the half-wave plate 60 is to optimize the change of polarization state, which can make the light passing through the quarter-wave plate better become circularly polarized light. Of course, in other embodiments, the half-wave plate 60 may not be provided, that is, compared with the display panel shown in FIG. 1, the half-wave plate 60 shown in FIG. 1 is removed in the display panel provided by other embodiments. The present embodiment of the present disclosure is explained by taking the case where the display panel includes the half-wave plate 60 as an example.

For example, in an embodiment of the present disclosure, the material of at least one of the half-wave plate and the quarter-wave plate is polycarbonate (PC) or cyclo olefin polymers (COP).

For example, as illustrated by FIG. 1, the display panel further includes a first electrode E1 located on the first base substrate 101 and a second electrode E2 located on the second base substrate 201; the first electrode E1 and the second electrode E2 are configured to form an electric field to drive the liquid crystal molecules 301 in the liquid crystal layer 30 to rotate. For example, the first electrode E1 can be made of a transparent conductive material, and the second electrode E2 can be made of a metal material. The transparent conductive material includes indium tin oxide (ITO), but is not limited thereto. The first electrode E1 is made of a transparent conductive material to improve light transmittance and display effect.

For example, as illustrated by FIG. 1, the display panel includes a reflective element 203, to form a reflective display panel. For example, as illustrated by FIG. 1, the second electrode E2 is reused as a reflective element 203. That is, the second electrode E2 has the function of reflecting the light incident thereon, and the second electrode E2 and the reflective element 203 are integrated into one element to reduce the manufacturing process and the thickness of the display panel.

For example, the polarizer 40 can be a common polarizer, for example, the polarizer 40 can be made of a polymer material. For example, the polarizer 40 includes a polyethylene (PVA) polarizing film, but is not limited thereto. The polarizer 40 can also adopt a wire grid polarizing film (WGP) as long as the polarizer 40 can convert the natural light incident on the polarizer 40 into polarized light with a polarization direction parallel to the transmission axis direction of the polarizer 40.

The polarizer includes a transmission axis. When a beam of natural light irradiates the polarizer, light whose polarization direction is parallel to the transmission axis can pass through the polarizer, while light whose polarization direction is perpendicular to the transmission axis cannot pass through the polarizer.

For example, in the embodiment of the present disclosure, the wave plate acts as a phase retarder, and the phase retarder is used to generate phase retardation for two lights whose vibration directions are perpendicular to each other. A direction of light vector with fast propagation speed in the wave plate is a fast axis, and a direction of light vector with slow propagation speed in the wave plate is a slow axis. In an ideal situation, with regard to the quarter-wave plate, if the direction of the light vector of a linearly polarized light incident thereon is consistent with the direction of the fast axis or the slow axis, the outgoing light is still linearly polarized light; if the direction of the light vector of a linearly polarized light incident thereon forms an angle of 45 degrees with both directions of the fast axis and the slow axis, the outgoing light is circularly polarized light; and if the direction of the light vector of a linearly polarized light incident thereon forms other angles with the directions of the fast axis and the slow axis, the outgoing light is elliptically polarized light. After passing through the quarter-wave plate, circularly polarized light becomes linearly polarized light. In the case where an elliptically polarized light is incident thereon, if the direction of the long axis or short axis of the elliptically polarized light is consistent with the direction of the fast axis or the slow axis of the wave plate, the outgoing light is linearly polarized light, and if the direction of the long axis or short axis of the elliptically polarized light have other directions, the outgoing light is still elliptically polarized light. In an ideal situation, with regard to a half-wave plate, when circularly (elliptically) polarized light is incident, the outgoing light is still circularly (elliptically) polarized light, but the rotation direction is opposite; when linearly polarized light is incident, the outgoing light is still linearly polarized light. If the included angle between the polarization direction of the linearly polarized light incident thereon and the fast (slow) axis is A, the vibration direction of the outgoing light rotates by 2A toward the fast (slow) axis.

Figure 2:
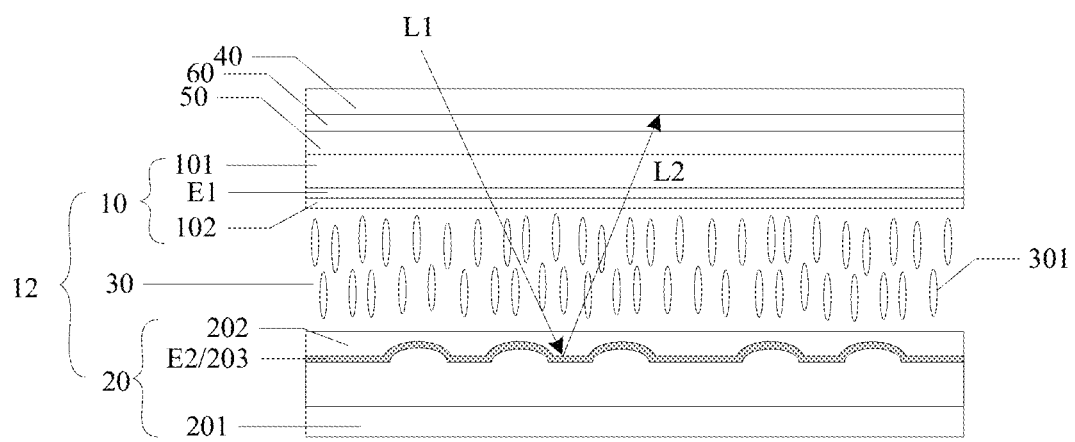
FIG. 2 is a schematic diagram of a display panel, which is powered on, provided by an embodiment of the present disclosure.

FIG. 2 is a schematic diagram of a display panel, which is powered on, provided by an embodiment of the present disclosure. The display panel shown in FIG. 1 is in a white state when the power is off, and the display panel shown in FIG. 2 is in a black state when the power is on. In the display panel provided by the embodiment of the present disclosure, the liquid crystal layer adopts twisted nematic (TN) phase liquid crystal, but is not limited thereto. For example, the reflective element 203 is located at a side of the second base substrate 201 facing the liquid crystal layer 30, and the reflective element 203 is configured to reflect light incident thereon. Thereby, a reflective display panel is formed. For example, the display panel provided by the embodiment of the present disclosure is a reflective display panel of a TN normally white mode.

For example, in the embodiment of the present disclosure, the display panel includes a plurality of sub-pixels, and the structure of one sub-pixel is shown in FIG. 1. The first electrodes E1 of different sub-pixels can be connected together to form a plate-like common electrode, while the second electrodes E2 of different sub-pixels are independent from each other and can be applied with signals respectively, so as to realize independent control of the sub-pixels and realize image display.

For example, with regard to a reflective display product such as a smart watch or a tablet computer, the light source (sunlight/light, etc.) and human eyes are often unable to be located at an incident end and an emergent end of the same reflective light path, which brings inconvenience to use. Therefore, it is needed to increase an optical structure to increase the visible range of the outgoing light.

For example, as illustrated by FIGS. 1 and 2, in order to increase the viewing angle, the display panel includes a scattering film M, which includes a scattering structure 204 and a reflective element 203 located at a side of the scattering structure 204 away from the second base substrate 201, the scattering structure 204 includes a plurality of protrusions 2041 and recessed portions 2040 between adjacent ones of the plurality of protrusions 2041, the scattering structure 204 is located at a side of the second base substrate 201 facing the first base substrate 101. The protrusions 2041 and the recessed portions 2040 located between the adjacent ones of the adjacent protrusions 2041 can allow the reflective element 203, which is conformally formed on the scattering structure 204, have a diffuse reflection effect, and expand the viewing angle of the display panel. Of course, in other embodiments, the display panel may not include the scattering structure 204, but may be provided with a scattering film, which may be located between the liquid crystal cell and the polarizer. This situation will be described later.

In the specification test and application, the reflectivity of the reflective display panel currently adopts the method of collimating light being incident vertically and receiving the reflected light reflected at an inclination angle of 30 degrees. If the scattering structure or the scattering film is not used, the reflectivity in this direction will be extremely low; and the reflectivity in this direction can be increased by adding the scattering structure or the scattering film.

As illustrated by FIGS. 1 and 2, the liquid crystal cell 12 includes a first substrate 10, a second substrate 20 and a liquid crystal layer 30 therebetween. The display panel shown in FIGS. 1 and 2 may also include a color film layer to realize color display, and the color film layer may be disposed on the first base substrate 101, and the first substrate 10 constitutes a color film substrate. For example, the color film layer is located between the first electrode E1 and the first base substrate 101; or, the color film layer is located between the first electrode E1 and the first alignment film 102. The embodiment of the present disclosure does not limit the setting position of the color film layer.

Figure 3:
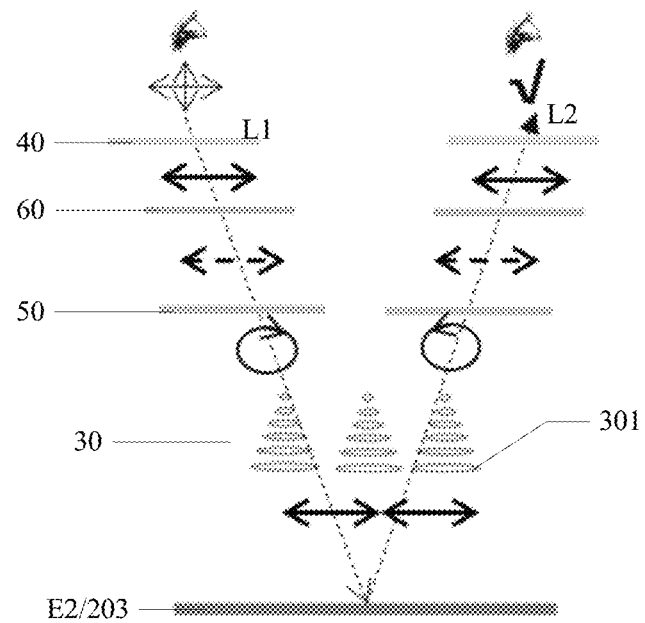
FIG. 3 is a principle diagram of displaying a white state by the display device shown in FIG. 1.
Figure 4:
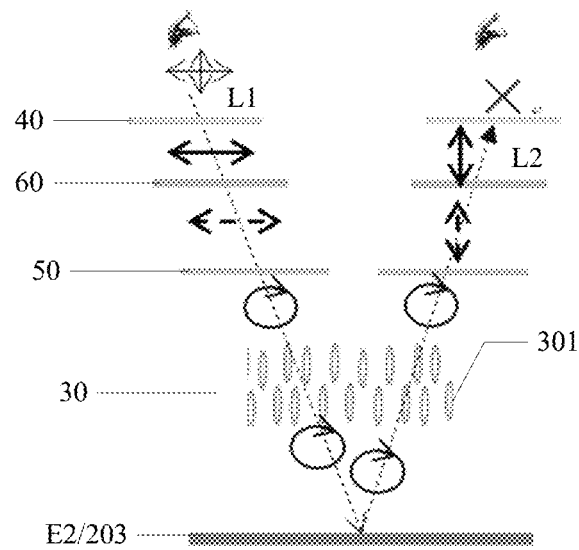
FIG. 4 is a principle diagram of displaying a black state by the display device shown in FIG. 2.
Figure 5:
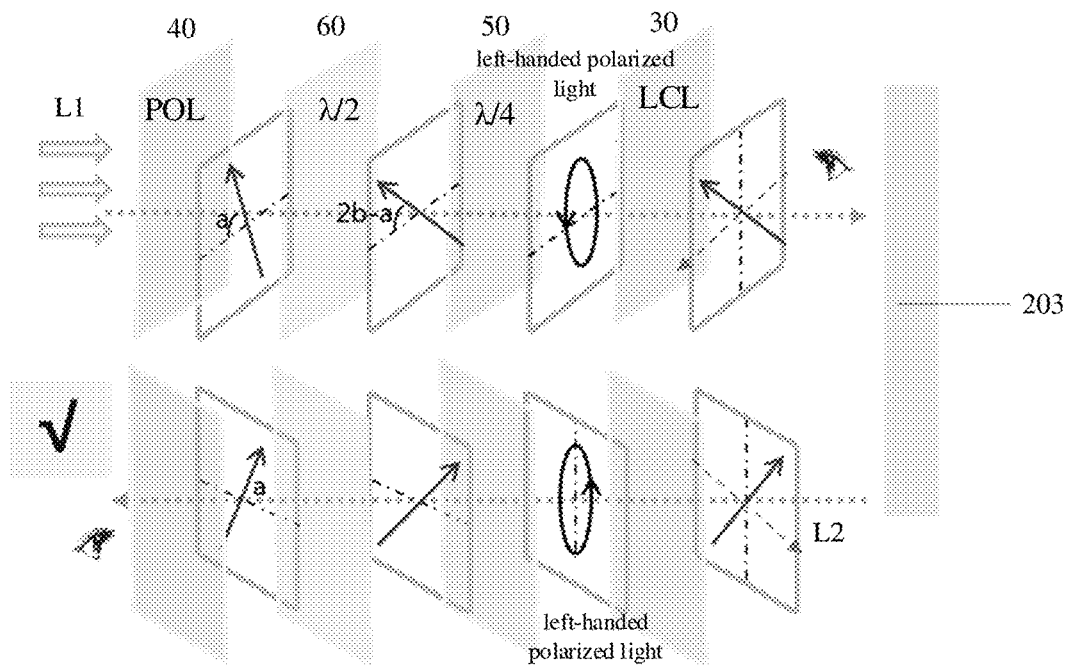
FIG. 5 is a schematic diagram of a light deflection state of the display device shown in FIG. 1.
Figure 6:
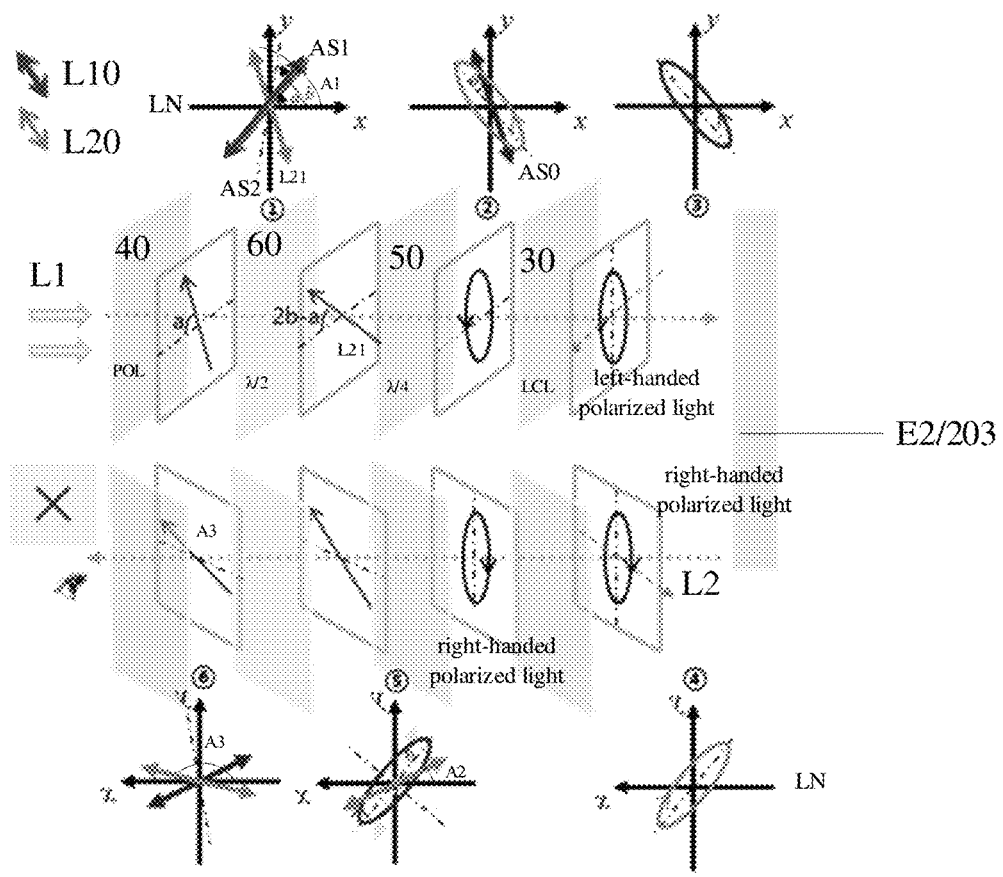
FIG. 6 is a schematic diagram of a light deflection state of the display device shown in FIG. 2.

FIG. 3 is a schematic diagram showing a white state of the display device shown in FIG. 1. FIG. 4 is a schematic diagram showing a black state of the display device shown in FIG. 2. FIG. 5 is a schematic diagram of a light deflection state of the display device shown in FIG. 1. FIG. 6 is a schematic diagram of a light deflection state of the display device shown in FIG. 2. Hereinafter, the optical structure and basic principle of the display panel of the reflective TN normally white mode will be described with reference to FIGS. 1 to 6.

Referring to FIG. 1, FIG. 3 and FIG. 5, the display panel displays a white state under a power-off state. For example, an incident light L1 is incident on the display panel, passes through the polarizer (POL) 40, the half-wave plate ($\lambda/2$) 60, the quarter-wave plate ($\lambda/4$) 50 and the liquid crystal layer (LCL) 30, and reaches the reflective element 203, and is reflected by the reflective element 203 to obtain a reflected light L2, the reflected light L2 passes through the liquid crystal layer (LCL) 30, the quarter-wave plate ($\lambda/4$) 50, the half-wave plate ($\lambda/2$) 60, and the polarizer (POL) 40 to emit out, the display panel displays a white state.

With reference to FIG. 2, FIG. 4 and FIG. 6, under a power-on state, the display panel displays a black state, because the liquid crystal molecules 301 of the liquid crystal layer 30 are erected under the action of an electric field, the reflected light L2 cannot pass through the polarizer (POL) 40, and the display panel displays a black state. For example, the incident light L1 is incident on the display panel, passes through the polarizer (POL) 40, the half-wave plate ($\lambda/2$) 60, the quarter-wave plate ($\lambda/4$) 50, and the liquid crystal layer (LCL) 30 to reach the reflective element 203, and is reflected by the reflective element 203 to obtain the reflected light L2, and the emitted light L2 passes through the liquid crystal layer (LCL) 30, the quarter-wave plate ($\lambda/4$) 50, and the half-wave plate ($\lambda/2$) 60, but cannot pass through the polarizer 40, and thus a black state is displayed.

For example, in the embodiment of this disclosure, the power-on state refers to that the liquid crystal layer is under the action of electric field, and the power-off state refers to that the liquid crystal layer is not under the action of electric field. For example, in the power-on state, there is a voltage difference between the first electrode E1 and the second electrode E2, and an electric field is formed to drive the liquid crystal molecules to rotate; in the power-off state, there is no voltage difference between the first electrode E1 and the second electrode E2 and no electric field is generated, and the liquid crystal molecules do not rotate.

Referring to FIGS. 1, 3 and 5, in the case where no electric field is applied to the liquid crystal layer (power-off), the liquid crystal molecules do not rotate, that is, the liquid crystal molecules do not act on light, and the display panel displays a white state (reflecting the incident light). For example, the incident light L1 generates linearly polarized light after passing through the polarizer 40, and the polarization direction of the linearly polarized light is the same as the extension direction of the transmission axis AS1 of the polarizer 40. For convenience of description, a reference line LN is introduced as a reference, which is a dummy line and does not exist in actual products. An included angle between the transmission axis AS1 and the reference line LN is a; the linearly polarized light passes through the half-wave plate 60, and the polarization direction of the linearly polarized light is deflected by a certain angle; generally, the polarization direction of linearly polarized light (linearly polarized light after passing through the half-wave plate 60) incident on the quarter-wave plate 50 needs to make an angle of 45 degrees with the slow axis of the quarter-wave plate 50; in this case, the linearly polarized light passes through the quarter-wave plate 50 and is converted into circularly polarized light. By adjusting the cell gap of the liquid crystal layer 30, the retardation of the liquid crystal layer is adjusted to ¼ of the wavelength of the incident light (i.e., the liquid crystal layer 30 is equivalent to a quarter-wave plate). After passing through the liquid crystal layer 30, the circularly polarized light is converted into linearly polarized light, and the polarization direction is changed from the previous linearly polarized light. The reflected light L2 after passing through the reflective layer 203 is linearly polarized light, which produces half-wave loss, and the polarization direction of the linearly polarized light is "mirror reversed". After passing through the liquid crystal layer 30, the reflected light L2 is converted into circularly polarized light, and the rotation direction of the circularly polarized light is the same as that of the incident circularly polarized light (the rotation direction of the circularly polarized light is judged by observing against the propagation direction of the light); the reflected light is converted into linearly polarized light by the quarter-wave plate 50, and then is deflected and modulated by the half-wave plate 60. The polarization direction of the linearly polarized light is the same as the direction of the transmission axis of the polarizer, and the reflected light emits from the polarizer 40 to realize a normally white state. As illustrated by FIG. 2, FIG. 4 and FIG. 6, in the power-on state, the liquid crystal molecules 301 rotate under the action of the electric field, the liquid crystal molecules 301 are erected, the polarization state and rotation direction of the light passing through the liquid crystal layer are not changed, and the reflected light L2 reaches the polarizer as linearly polarized light, and the polarization direction of the linearly polarized light forms an included angle of 90 degrees with the direction of the transmission axis of the polarizer 40, so that the reflected light L2 cannot pass through the polarizer 40, so as to realize the black state. For example, the "mirror reversed" of the polarization direction of the linearly polarized light refers to that the polarization directions of linearly polarized light are mirror symmetric with respect to an observer outside the display panel in FIG. 5.

For example, the transmission axis AS1 of the polarizer 40, the slow axis AS2 of the half-wave plate 60, and the slow axis AS0 of the quarter-wave plate 50 are shown in FIG. 6. FIG. 6 shows incident light L10 and outgoing light L20 for the same element. For example, in the embodiment of the present disclosure, the transmission axis AS1 of the polarizer 40, the slow axis AS2 of the half-wave plate 60, the slow axis AS0 of the quarter-wave plate 50, and the slow axis of the liquid crystal layer are parallel to a surface of the first base substrate. The surface of the first base substrate may be a surface close to the second base substrate or a surface away from the second base substrate, but is not limited thereto.

Figure 7:
FIG. 7 is a dispersion curve of a half-wave plate.

FIG. 7 is a dispersion curve of a half-wave plate. FIG. 7 shows the dispersion curves of two half-wave plates, one of which is the dispersion curve of a half-wave plate 601 and the other is the dispersion curve of a half-wave plate 602. For example, the material of the half-wave plate 601 is PC with retardation of 270 nm, which can be denoted as PC-270, and the material of the half-wave plate 602 is COP with retardation of 270 nm, which can be denoted as COP-270. It can be seen from FIG. 7 that the actual half-wave plate is not a perfect half-wave plate.

Under the ideal optical path model (the wave plates are perfectly matched with the wavelength), the transmission axis of the polarizer 40 and the slow axis of the half-wave plate 60 can form any angle, but considering the actual situation, the matching among the wave plates and the matching between the liquid crystal layer and the wave plates are imperfect (as illustrated by FIG. 7, the dispersion curve of the actual half-wave plate is quite different from the ideal situation, and the quarter-wave plate is the same).

Figure 8A:
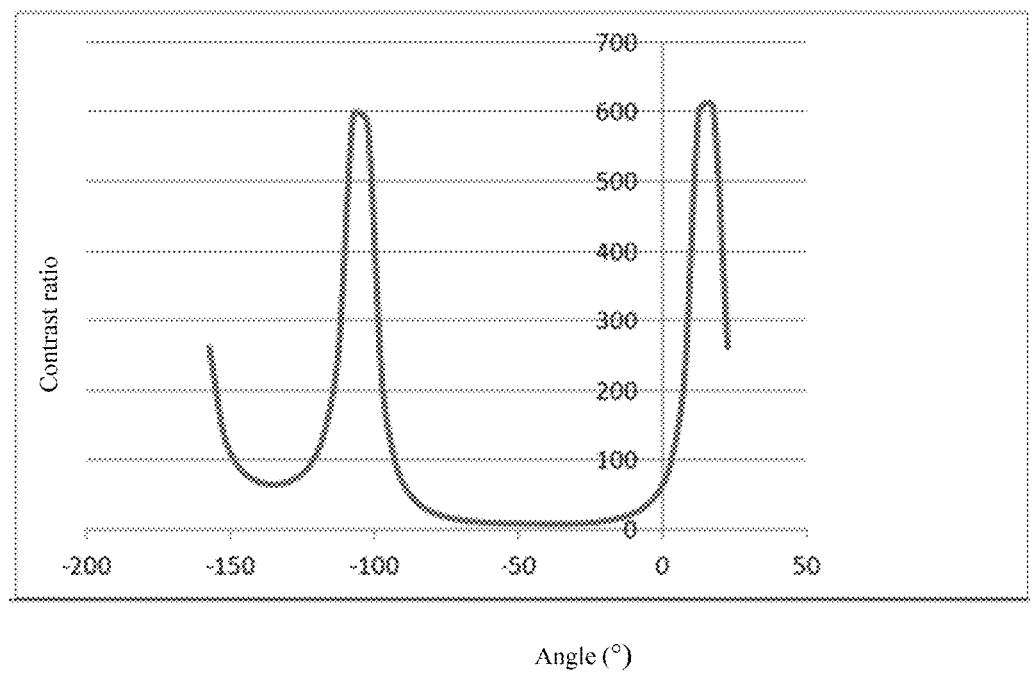
FIGS. 8A and 8B are schematic diagrams of simulation results of contrast ratio upon a transmission axis of the polarizer and a slow axis of the half-wave plate being configured at different angles.
Figure 8B:
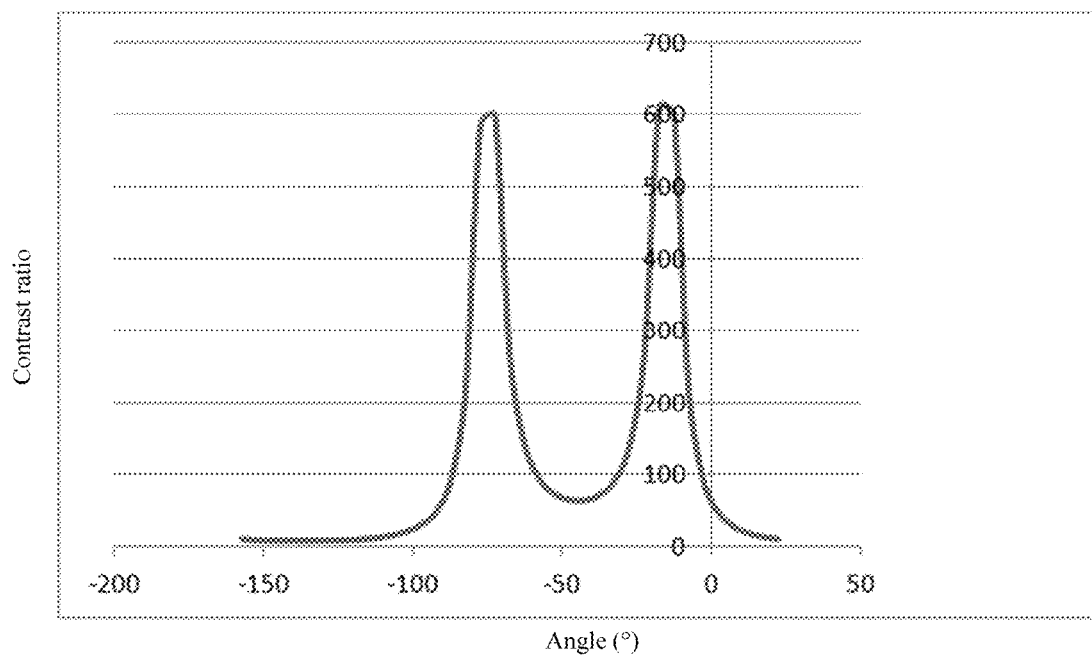

FIGS. 8A and 8B are schematic diagrams of simulation results of contrast ratio upon the transmission axis of polarizer and the slow axis of half-wave plate being configured at different angles. It can be seen from the figures that the contrast ratio of the display panel is different upon the transmission axis of the polarizer and the slow axis of the half-wave plate being configured at different angles, and an included angle between the transmission axis AS1 of the polarizer 40 and the slow axis AS2 of the half-wave plate 60 has obvious influence on the contrast ratio of the reflective LCD display. The results shown in FIGS. 8A and 8B are curves of contrast ratio upon the transmission axis of polarizer and the slow axis of half-wave plate forming angles clockwise and counterclockwise, respectively.

For example, in order to improve the contrast ratio, the angle between the transmission axis AS1 of the polarizer 40 and the slow axis AS2 of the half-wave plate 60 is 15±10 degrees, or 70±10 degrees. That is, the included angle between the transmission axis of the polarizer 40 and the slow axis of the half-wave plate 60 is in the range from 5 degrees to 25 degrees, or in the range from 60 degrees to 80 degrees. Upon the included angle between the transmission axis of the polarizer 40 and the slow axis of the half-wave plate 60 being within the above angle range, the contrast ratio of the display panel is relatively high.

For example, because the matching among the wave plates and the matching between the liquid crystal layer and the wave plates are imperfect, upon the included angle between the outgoing light of the half-wave plate 60 and the slow axis of the quarter-wave plate 50 is in the range of 45±5 degrees, the display panel has a relatively high contrast ratio. It should be noted that the outgoing light of the half-wave plate 60 is linearly polarized light, and the polarization direction of the linearly polarized light can be controlled by the included angle between the half-wave plate 60 and the transmission axis of the polarizer 40. As illustrated by FIG. 6, for example, the angle between the polarization direction of the outgoing light L21 of the half-wave plate 60 and the reference line LN is $A1=a+2(b-a)=2b-a$, the angle between the polarization direction of linearly polarized light and the slow axis AS0 of the quarter-wave plate 50 is $\theta$, the long axis of the outgoing elliptically polarized light is parallel to the slow axis AS0 of the quarter-wave plate 50, and the light is left-handed elliptically polarized light (or right-handed elliptically polarized light) before reflection. The reflected light is right-handed elliptically polarized light (or left-handed elliptically polarized light) due to the half-wave loss. After passing through the quarter-wave plate 50 again, the included angle between the polarization direction of linearly polarized light and the reference line LN is $A2=(2b-a)+2\theta=(2b-a)+2(c-2b+a)=2c-2b+a$, and after passing through the half-wave plate 60 again, the included angle between the polarization direction of linearly polarized light and the reference line LN is $A3=(2c-2b+a)-2(2c-2b+a-b)=-a+4b-2c$, and zero gray scale (L0) achieves the minimum brightness, and the polarization direction of linearly polarized light passing through the polarizer 40 is orthogonal to the transmission axis of the polarizer, then, $-a+4b-2c-a=90$ degrees→$2b-a-c=45$ degrees. The included angle between the outgoing light of the half-wave plate 60 and the slow axis direction of the quarter-wave plate 50 should be 45 degrees, and the outgoing light passing through the quarter-wave plate 50 is circularly polarized light. At this time, the polarization direction of the outgoing light of the reflective light path is orthogonal to the transmission axis of the polarizer, thus achieving the lowest L0 brightness. Considering the actual situation, the optical characteristics of the layers are not perfectly matched with the wavelength, so the polarization direction of linearly polarized light emitted from the half-wave plate 60 forms an angle of 45±5 degrees with the slow axis AS0 of the quarter-wave plate 50. That is, the included angle between the polarization direction of light emitted from the half-wave plate 60 and the slow axis of the quarter-wave plate 50 is in the range from 40 degrees to 50 degrees. For example, the included angle between the outgoing light of the half-wave plate 60 and the slow axis of the quarter-wave plate 50 is 46 degrees or 44 degrees.

Figure 9:
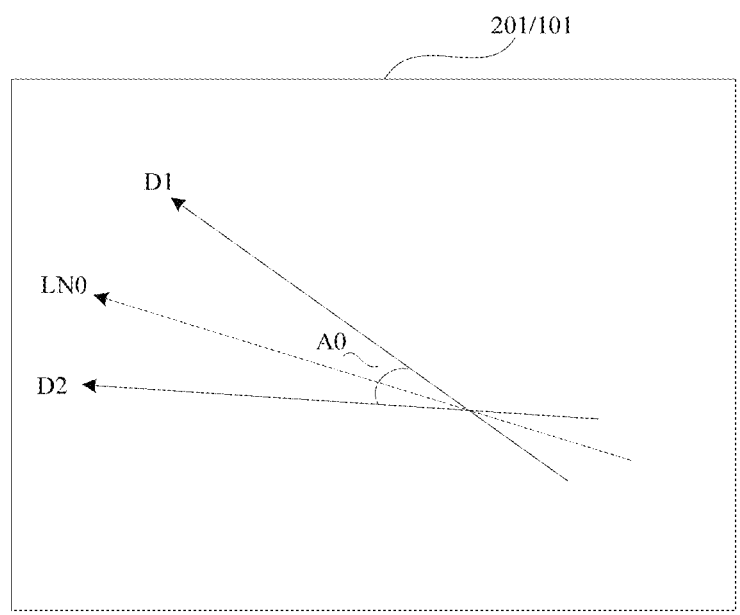
FIG. 9 is a schematic diagram of a first alignment direction of a first alignment film, a second alignment direction of a second alignment film, an included angle between the first alignment direction and the second alignment direction, and a center line of the included angle of a display panel according to an embodiment of the present disclosure.

FIG. 9 is a schematic diagram of a first alignment direction of a first alignment film, a second alignment direction of a second alignment film, an included angle between the first alignment direction and the second alignment direction, and a center line of the included angle of a display panel according to an embodiment of the present disclosure. With reference to FIGS. 1, 2, 6 and 9, the first alignment film 102 includes a first alignment direction D1, and the second alignment film 202 includes a second alignment direction D2. An included angle between a center line LN0 of an included angle A0 between the first alignment direction D1 and the second alignment direction D2 and a slow axis AS0 of the quarter-wave plate 50 is in the range from 75 to 105 degrees. That is, the included angle between the slow axis of the quarter-wave plate 50 and the center line LN of the included angle A0 between the first alignment direction D1 and the second alignment direction D2 is in the range of 90±15 degrees.

According to the display panel provided by the embodiment of the present disclosure, the range of the included angle between the slow axis of the quarter-wave plate 50 and the center line LN0 of the included angle A0 between the first alignment direction D1 and the second alignment direction D2 is set to 90±15 degrees, which can reduce the reflectivity of the black state, thereby improving the contrast ratio of the display panel and improving the display effect.

In an ideal situation, the liquid crystal molecules are completely erected upon the power being applied. However, upon the power being applied, the liquid crystal molecules may not be completely erected, or the liquid crystal layer includes a certain birefringence (though small) because of the pretilt angle, thereby forming a certain phase delay, which makes the liquid crystal layer have a certain optical axis (slow axis). By setting the included angle between the slow axis AS0 of the quarter-wave plate 50 and the slow axis of the liquid crystal layer, the black state is darker, the reflectivity of the black state is lower, and the reflectivity of the black state is reduced.

For example, by adjusting the thickness of the liquid crystal layer 30, the retardation of the liquid crystal layer 30 acting on the incident light is adjusted so that the liquid crystal layer 30 serves as a quarter-wave plate and the center line LN0 of the included angle A0 between the first alignment direction D1 and the second alignment direction D2 serves as the slow axis of the liquid crystal layer 30, so that the included angle between the slow axis of the liquid crystal layer 30 and the slow axis of the quarter-wave plate 50 is in the range from 75 to 105 degrees. For example, the included angle A0 between the first alignment direction D1 and the second alignment direction D2 is in the range from 48 to 58 degrees, or in the range from 71 to 81 degrees. For example, the included angle between the first alignment direction D1 and the second alignment direction D2 is 53±5 degrees or 76±5 degrees, but is not limited thereto.

For example, the liquid crystal molecules of the liquid crystal layer have a twist angle. For example, the twist angle is the included angle between the first alignment direction D1 and the second alignment direction D2. For example, upon no power being applied, a long axis direction of liquid crystal molecules close to the first alignment film 102 may be parallel to the first alignment direction D1, and a long axis direction of liquid crystal molecules close to the second alignment film 202 may be parallel to the second alignment direction D2. Under the action of the electric field, the liquid crystal molecules of the liquid crystal layer can rotate, so that an extending direction of the long axis of the liquid crystal molecules is perpendicular to the first base substrate 101 or the second base substrate 201. For example, in some embodiments of the present disclosure, the twist angle is the above-mentioned included angle A0, and the twist angle is in the range from 48 to 58 degrees, or in the range from 71 to 81 degrees. For example, in some embodiments of the present disclosure, the twist angle is in the range of 53±5 degrees or 76±5 degrees.

For example, in the embodiment of the present disclosure, the first alignment direction D1 may refer to a direction of an orthographic projection of the long axis of liquid crystal molecules close to the first alignment film 102 on the first base substrate upon no power being applied, and the second alignment direction D2 may refer to a direction of an orthographic projection of the long axis of liquid crystal molecules close to the second alignment film 202 on the first base substrate upon no power being applied. For example, in the case where the first alignment film and the second alignment film are formed by a rubbing mode, the first alignment direction D1 may be a rubbing direction for forming the first alignment film, and the second alignment direction D2 may be a rubbing direction for forming the second alignment film. Of course, the first alignment film and the second alignment film can also be made in other modes, which is not limited by the embodiments of the present disclosure.

For example, in the embodiment of the present disclosure, in order to improve the response speed of the liquid crystal molecules, the liquid crystal molecules of the liquid crystal layer have a pretilt angle. For example, the pretilt angle may refer to the included angle between the long axis of the liquid crystal molecules and the surface of the first base substrate or the second base substrate.

Based on the basic principle of reflective TN normally white mode, some embodiments of the present disclosure define the combination of polarizer, half-wave plate, quarter-wave plate, center line (LN0) of the included angle between the alignment direction of the first alignment film and the alignment direction of the second alignment film.

For example, in some embodiments of the present disclosure, the included angle between the slow axis of the quarter-wave plate 50 and the center line LN of the included angle A0 between the first alignment direction D1 and the second alignment direction D2 is in the range of 90±15 degrees, the included angle between the polarization direction of light emitted from the half-wave plate 60 and the slow axis of the quarter-wave plate 50 is in the range from 40 to 50 degrees, and the angle between the transmission axis AS1 of the polarizer 40 and the slow axis AS2 of the half-wave plate 60 is 15±10 degrees or 70±10 degrees, and the display panel adopting the combination of the above-mentioned parameters has a relatively high contrast ratio.

Based on the basic principle of reflective TN normally white mode, some embodiments of the present disclosure define the combination of polarizer, half-wave plate, quarter-wave plate, center line (LN0) of the included angle between the alignment direction of the first alignment film and the alignment direction of the second alignment film, twist angle, and cell gap. For example, the cell gap refers to the thickness of the liquid crystal cell. The cell gap may refer to the thickness of the space where the liquid crystal layer can be accommodated, but is not limited thereto. FIG. 1 shows the cell gap H. For example, in some embodiments of the present disclosure, the included angle between the slow axis of the quarter-wave plate 50 and the center line LN of the included angle A0 between the first alignment direction D1 and the second alignment direction D2 is in the range of 90±15 degrees, and the included angle between the polarization direction of the light emitted from the half-wave plate 60 and the slow axis of the quarter-wave plate 50 is in the range from 40 to 50 degrees. The angle between the transmission axis AS1 of the polarizer 40 and the slow axis AS2 of the half-wave plate 60 is 15±10 degrees or 70±10 degrees, and the twist angle is in the range of 53±5 degrees or 76±5 degrees. By adjusting the thickness of the liquid crystal layer 30, the liquid crystal layer 30 acts as a quarter-wave plate, the display panel adopting the combination of the abovementioned parameters has a relatively contrast ratio. The twist angle of the liquid crystal layer is related to the retardation/material of the quarter-wave plate.

Figure 10:
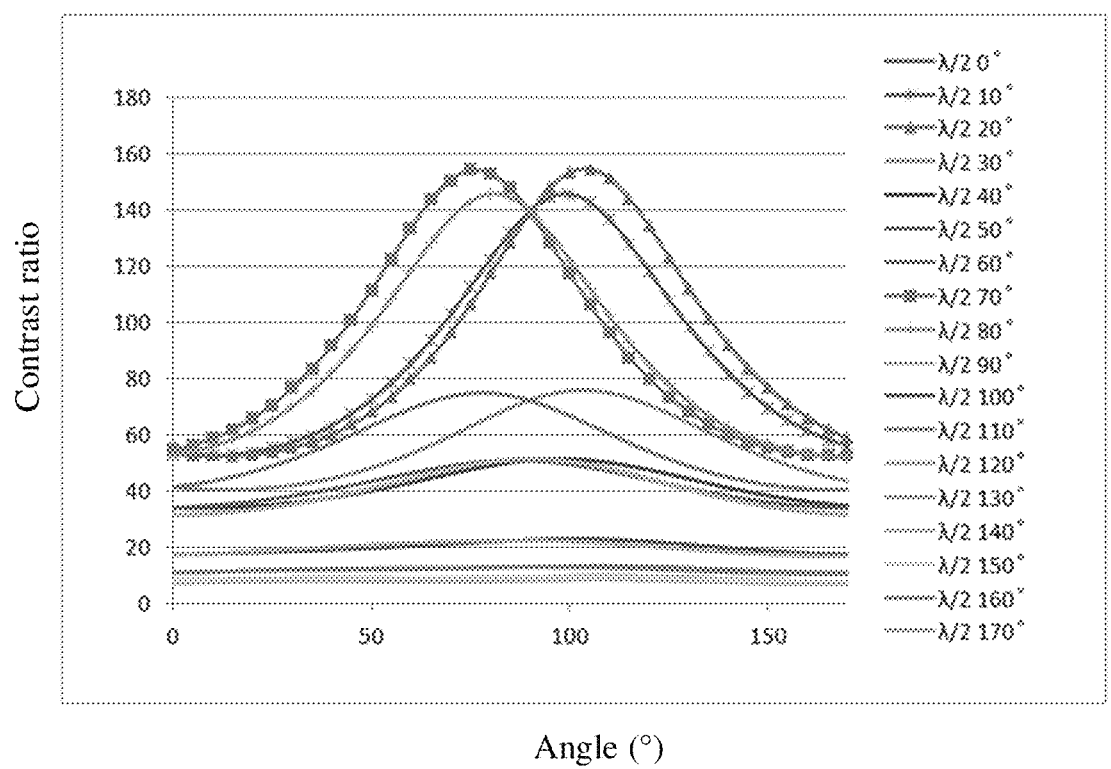
FIG. 10 is a graph showing a relationship between the contract ratio and an included angle between a slow axis of a quarter-wave plate and a slow axis of a liquid crystal layer under different conditions upon a transmission axis of the polarizer and a slow axis of the half-wave plate having different included angles therebetween.

FIG. 10 is a graph showing a relationship between an included angle between a slow axis of a quarter-wave plate and a slow axis of a liquid crystal layer and contrast ratio under different conditions upon an included angle between a transmission axis of the polarizer and a slow axis of the half-wave plate being different. For example, the actually used quarter-wave plate is an imperfect quarter-wave plate for most wavelengths of color light. The best angle between the slow axis of the quarter-wave plate and the center line of the included angle between the first alignment direction D1 and the second alignment direction D2 is simulated. For example, the twist angle is unchanged, the included angle between the slow axis of the half-wave plate and the transmission axis of the polarizer changes, the slow axis of the quarter-wave plate, the slow axis of the liquid crystal layer, and the slow axis of the half-wave plate are also changed according to the angular relationship described above, and the included angle between the slow axis of the quarter-wave plate and the slow axis of the liquid crystal layer changes from 0 to 180 degrees. The simulation results are shown in FIG. 10. In the case where the included angle between the slow axis of quarter-wave plate and the slow axis of LC is in the range from 75 to 105 degrees, the overall contrast ratio is high, and the contrast ratio attenuation is obvious in other angles.

For example, in the embodiment of the present disclosure, the angle simulation range of the optimized design is determined by defining the angle design relationship among the layers, and the best design scheme is given, so that the contrast ratio of the reflective display panel is greatly improved and the reflectivity is improved at the same time.

Figure 11:
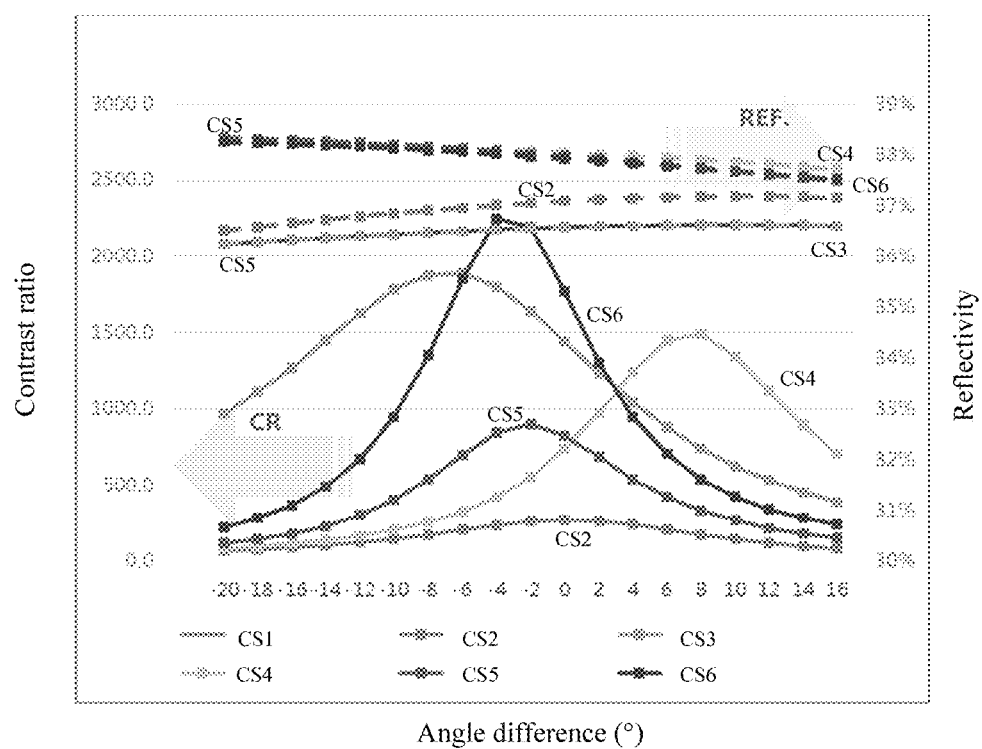
FIG. 11 is a schematic diagram showing the change of reflectivity and contrast ratio with an included angle between a slow axis of the half-wave plate and a transmission axis of the polarizer.

FIG. 11 is a schematic diagram showing the change of reflectivity and contrast ratio with an included angle between a slow axis of the half-wave plate and a transmission axis of the polarizer. In FIG. 11, the changes of the slow axis of the quarter-wave plate and the slow axis of the liquid crystal layer are changed with the change of the included angle between the half-wave plate and the transmission axis of the polarizer according to the abovementioned parameter range.

According to the abovementioned angular relationship among the optical films (the best angle between the transmission axis of the polarizer and the slow axis of the half-wave plate is 15±10 degrees or 70±10 degrees, and the included angle between the center line LN0 of the included angle A0 between the first alignment direction D1 and the second alignment direction D2 and the slow axis AS0 of the quarter-wave plate 50 is in the range of 90±15 degrees), the simulation workload of the angle scheme can be greatly reduced. According to these included angle relationships, simulation can be carried out near these angles to find a suitable angle matching scheme. In FIG. 11, the combination results of the half-wave plate made of two materials (COP270/PC270) and the quarter-wave plate made of two materials (PC160/COP140) are listed. It can be seen that, with regard to COP140, it is simulated that the included angle between the slow axis of the half-wave plate and the polarizer fluctuates around 79−10 degrees to 79+9 degrees, that is, 69−88 degrees, and the angle between the slow axis of half-wave plate and polarizer is 79 degrees or 76 degrees to obtain a relatively high contrast ratio. With regard to PC160, it is simulated that the included angle between the slow axis of half-wave plate and the transmission axis of polarizer is around 79−10 degrees to 79+9 degrees, that is, 69−88 degrees, and the angle between the slow axis of half-wave plate and polarizer is 70 degrees or 75 degrees to obtain a relatively high contrast ratio. The value of abscissa in FIG. 11 represents the difference from 79 degrees. For example, the position where the abscissa is 0 represents 79 degrees. −X represents an angle of 79 degrees minus X degrees, and X represents an angle of 79 degrees plus X degrees. In FIG. 11, in the case of CS1, the half-wave plate adopts COP270, the quarter-wave plate adopts COP140; in the case of CS2, the half-wave plate adopts PC270, the quarter-wave plate adopts COP140; in the case of CS3, the half-wave plate adopts PC270, the quarter-wave plate adopts PC140; in the case of CS4, the half-wave plate adopts COP270, the quarter-wave plate adopts PC160; in the case of CS5, the half-wave plate adopts PC270, the quarter-wave plate adopts PC160; in the case of CS6, the half-wave plate adopts COP270, the quarter-wave plate adopts COP160.

Table 1 gives the parameters and performance data of several display panels provided by the embodiments of this disclosure. Table 1 shows the display panels in the cases of CS1, CS2, CS3, CS4, CS5 and CS6. In the case of CS1, the half-wave plate adopts COP270, the quarter-wave plate adopts COP140; in the case of CS2, the half-wave plate adopts PC270, the quarter-wave plate adopts COP140; in the case of CS3, the half-wave plate adopts PC270, the quarter-wave plate adopts PC140; in the case of CS4, the half-wave plate adopts COP270, the quarter-wave plate adopts PC160; in the case of CS5, the half-wave plate adopts PC270, the quarter-wave plate adopts PC160; in the case of CS6, the half-wave plate adopts COP270, the quarter-wave plate adopts COP160.

In the embodiments of the present disclosure, the half-wave plate and the quarter-wave plate adopt the description mode of material plus retardation, and the unit of retardation is nanometer.

In Table 1, Vop represents the voltage in a dark state, and the unit is volt. POL represents polarizer, λ/2 represents half-wave plate, λ/4 represents quarter-wave plate, LCL represents liquid crystal layer, and Re. represents retardation, and the unit is nanometer. T/A represents twist angle, and the unit is degree. D1 represents first alignment direction, D2 represents second alignment direction, Ref. represents reflectivity, CR represents contrast ratio, Wx represents the abscissa of white point in color coordinates, and Wy represents the ordinate of white point in color coordinates. The arrow to the left indicates that its value is the same as that on the left. In table 1, the values in the POL row indicate the included angles between the transmission axis of polarizer and the reference line, and the difference between the two angles is 90 degrees, the included angle on the left or right side of oblique line can be used, under the two angles, the display effect is consistent, and the reflectivity and CR are the same. The values in the λ/2 rows represent the included angles between the slow axis of the half-wave plate and the reference line, and the values in the λ/4 row represents the included angles between the slow axis of the quarter-wave plate and the reference line.

As illustrated by FIG. 10, FIG. 11 and table 1, within the numerical range given above, the reflectivity of the display panel does not change much, and the contrast ratio is relatively high. Therefore, by setting the relevant parameters of the display panel within the above-mentioned parameter range, a display panel with higher contrast ratio can be obtained.

As illustrated by table 1, the display panels in the case of CS1, CS3, CS4 and CS6 are all relatively good, and the CR of the display panel in the case of CS4 is obviously improved. Compared with the cases of CS1-CS4, it can be concluded that the COP material is better than the PC material for half-wave plate and quarter-wave plate, and CR is obviously improved.

TABLE 1 parameters and performance data of display panels

|  |  | CS1 | CS2 | CS3 | CS4 | CS5 | CS6 |
|---|---|---|---|---|---|---|---|
| POL |  | 32/122 | 32/122 | 32/122 | 70/160 | 79/169 | 79/169 |
| $\lambda/2$ |  | 108 | 111 | 108 | 0 | 4 | 3 |
| $\lambda/4$ |  | 49 | 55 | 49 | 64 | 63 | 61 |
| LCL | Re. | 210 | ← | ← | ← | ← | ← |
|  | T/A | 76 | 76 | ← | 53 | 53 | ← |
|  | D1 | −82 | −76 | −82 | 126 | −55 | −57 |
|  | D2 | −6 | 0 | −6 | 179 | −2 | −4 |
| Ref. |  | 36.50% | 37.09% | 36.5% | 37.90% | 38.04% | 38.01% |
| Vop(V) |  | 4.2 | 4.2 | 4.2 | 2.9 | 3.2 | 3 |
| CR |  | 1889 | 272 | 1885 | 1487 | 894 | 2244 |
| Wx |  | 0.324 | 0.324 | 0.323 | 0.327 | 0.329 | 0.329 |
| Wy |  | 0.349 | 0.349 | 0.349 | 0.353 | 0.352 | 0.353 |

Figure 12:
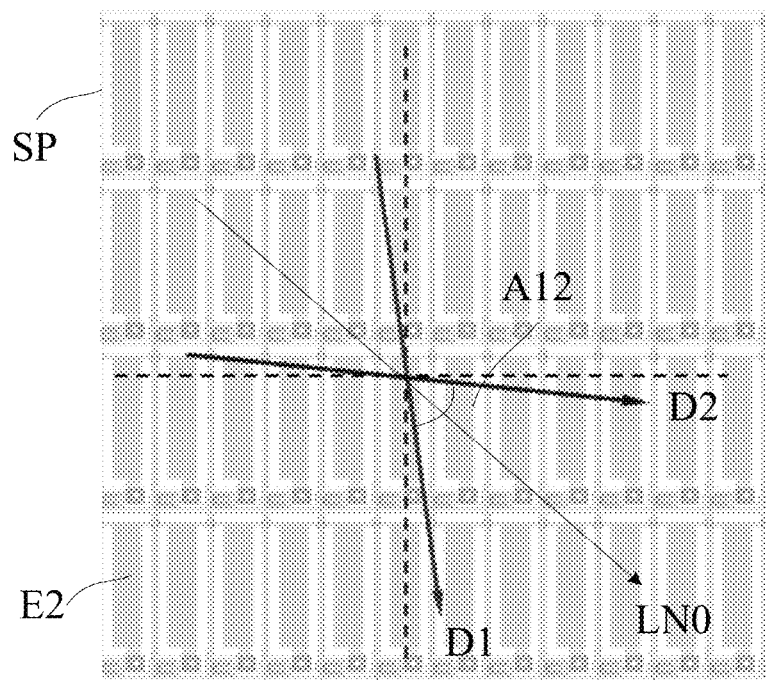
FIG. 12 is a schematic diagram of a first alignment direction of a first alignment film, a second alignment direction of a second alignment film, an included angle between the first alignment direction and the second alignment direction, and a center line of the included angle of a display panel according to an embodiment of the present disclosure.
Figure 13:
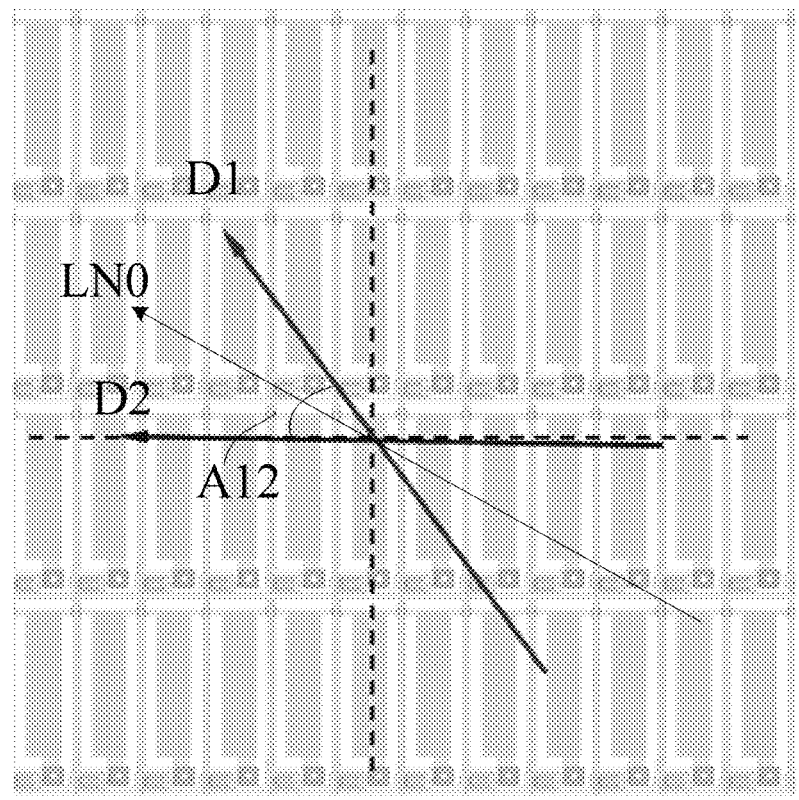
FIG. 13 is a schematic diagram of a first alignment direction of a first alignment film, a second alignment direction of a second alignment film, an included angle between the first alignment direction and the second alignment direction, and a center line of the included angle of a display panel according to another embodiment of the present disclosure.

FIG. 12 is a schematic diagram of a first alignment direction of a first alignment film, a second alignment direction of a second alignment film, an included angle between the first alignment direction and the second alignment direction, and a center line of the included angle of a display panel according to an embodiment of the present disclosure. FIG. 13 is a schematic diagram of a first alignment direction of a first alignment film, a second alignment direction of a second alignment film, an included angle between the first alignment direction and the second alignment direction, and a center line of the included angle of a display panel according to another embodiment of the present disclosure. As illustrated by FIG. 12, the first alignment direction D1 is −82 degrees, the second alignment direction D2 is −6 degrees, the included angle A12 between the first alignment direction D1 and the second alignment direction D is 76 degrees, and the center line of the included angle A12 between the first alignment direction D1 and the second alignment direction D is −44 degrees. As illustrated by FIG. 13, the first alignment direction D1 is 126 degrees, the second alignment direction D2 is 179 degrees, the included angle A12 between the first alignment direction D1 and the second alignment direction D is 53 degrees, and the center line of the included angle A12 between the first alignment direction D1 and the second alignment direction D is 152.5 degrees. The display panels shown in FIG. 12 and FIG. 13 have the parameters related to the liquid crystal layer in the cases of CS1 and CS4 described above, respectively. FIG. 12 illustrates the second electrode E2. The second electrode E2 can be connected to a thin film transistor, and whether the thin film transistor is turned on determines whether a voltage is input to the second electrode E2. One second electrode E2 corresponds to one subpixel SP.

Figure 14:
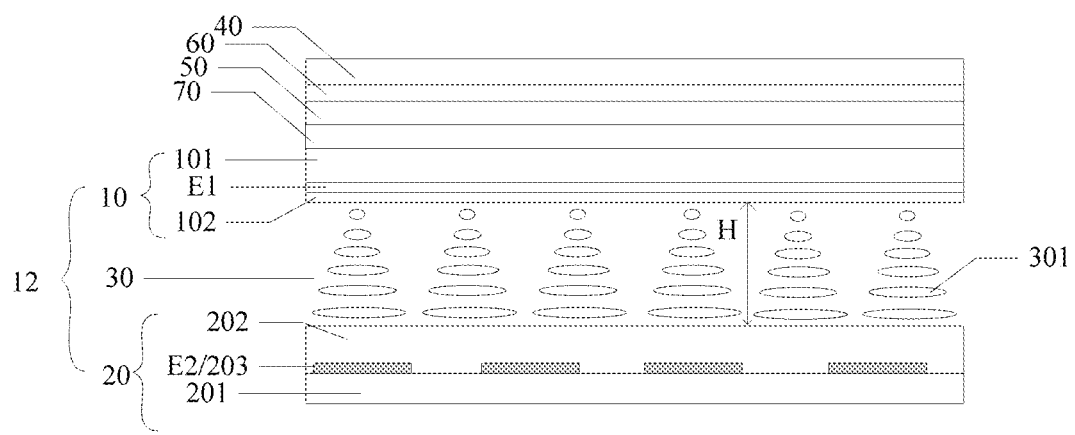
FIG. 14 is a schematic diagram of a display panel according to an embodiment of the present disclosure.

FIG. 14 is a schematic diagram of a display panel according to an embodiment of the present disclosure. As illustrated by FIG. 14, in order to increase the reflectivity in a certain direction or increase the viewing angle, the display panel further includes a scattering film 70. For example, the scattering film 70 is disposed between the polarizer 40 and the first base substrate 101. For example, as illustrated by FIG. 14, the scattering film 70 is located between the quarter-wave plate 50 and the first base substrate 101. For example, as illustrated by FIG. 14, the scattering film 70 is configured to scatter light incident thereon. The scattering film 70 can diffusely reflect the light incident thereon, so as to increase the viewing angle.

For example, the scattering film 70 can be made into a film assembly together with the polarizer 40, the half-wave plate 60 and the quarter-wave plate 50, and then the film assembly is attached to the liquid crystal cell. The film assembly can be attached to a side of the first substrate of the liquid crystal cell, which is away from the second base substrate, by an OCA glue. The film assembly can be a composite optical film.

Figure 15:
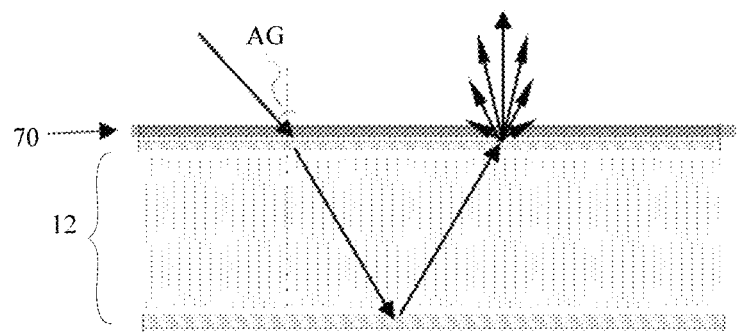
FIG. 15 is a schematic diagram of scattering light by a scattering film of a display panel according to an embodiment of the present disclosure.

FIG. 15 is a schematic diagram of scattering light by a scattering film of a display panel according to an embodiment of the present disclosure. As illustrated by FIG. 15, a beam of incident light is incident on the display panel at an incident angle AG, and if the light is not scattered, the outgoing light will be emitted at the same emitting angle, so that the viewing angle is relatively small, while the arrangement of the scattering film 70 enables the outgoing light to be emitted at multiple angles, so that the viewing angle can be increased.

Figure 16A:
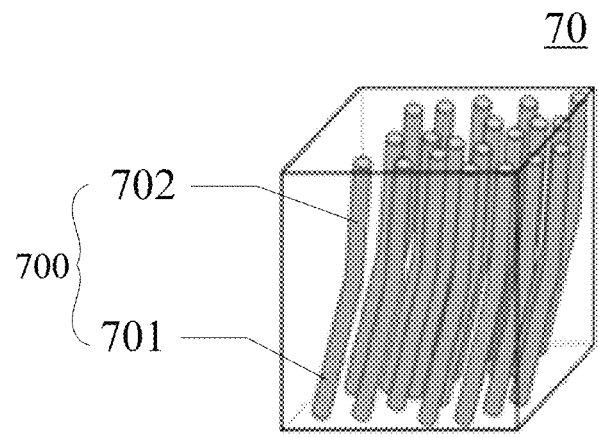
FIG. 16A is a schematic diagram of a scattering film of a display panel according to an embodiment of the present disclosure.
Figure 16B:
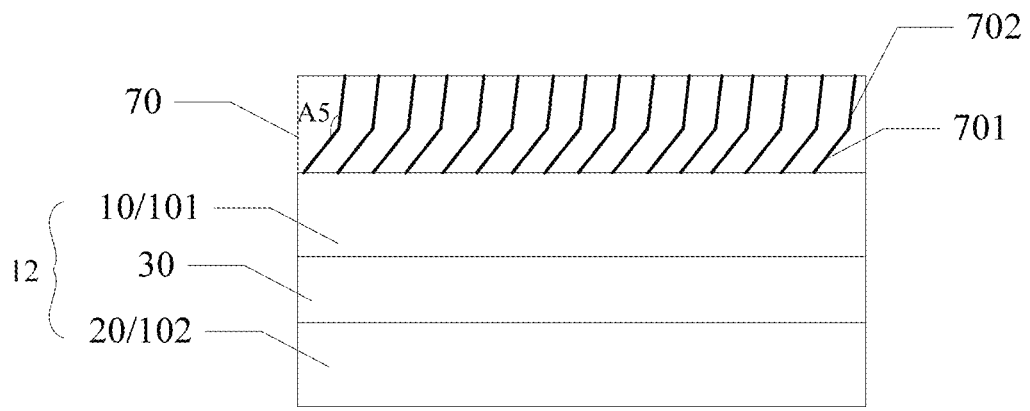
FIG. 16B is a schematic diagram of a display panel with a scattering film according to an embodiment of the present disclosure.

FIG. 16A is a schematic diagram of a scattering film of a display panel according to an embodiment of the present disclosure; FIG. 16B is a schematic diagram of a display panel with a scattering film according to an embodiment of the present disclosure. For example, as illustrated by FIGS. 16A and 16B, the scattering film 70 includes a plurality of scattering units 700, each of which has a rod-like shape and includes a first portion 701 and a second portion 702, and an included angle A5 between the first portion 701 and the second portion 702 is greater than 90 degrees and less than 180 degrees. For example, the plurality of scattering units 700 are uniformly and repeatedly arranged on the whole two-dimensional plane. The scattering film can guide and scatter light.

For example, as illustrated by FIG. 16B, the first portion 701 is closer to the first base substrate 101 than the second portion 702, and the included angle between the first portion 701 and the first base substrate 101 is larger than the included angle between the second portion 702 and the first base substrate 101.

For example, as illustrated by FIG. 16B, the included angle between the first portion 701 and the first base substrate 101 is an acute angle, and the included angle between the second portion 702 and the first base substrate 101 is an acute angle or a right angle. For example, the acute angle is greater than 0 degrees and less than or equal to 15 degrees. Further, for example, the acute angle is greater than or equal to 5 degrees and less than or equal to 15 degrees.

For example, the first portion 701 is closer to the first base substrate 101 than the second portion 702, and the included angle between the first portion 701 and the first base substrate 101 is the same as or opposite to a front view direction of the display panel.

Figure 16C:
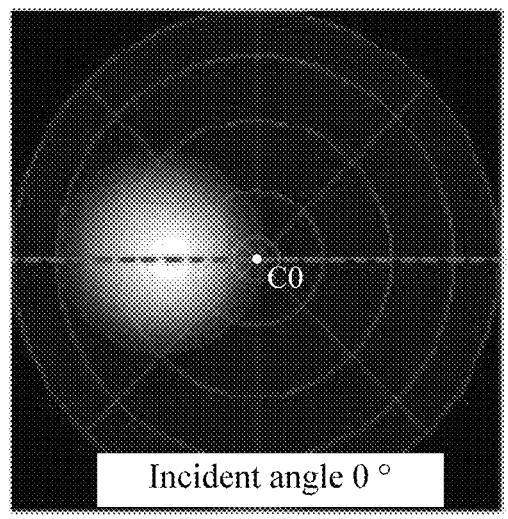
FIG. 16C is a scattering diagram showing scattering of a display panel with a scattering film provided by an embodiment of the present disclosure.

FIG. 16C is a scattering diagram of a display panel with a scattering film provided by an embodiment of the present disclosure. In the reflectivity test of the reflective display panel, the light source is incident vertically on the display panel, and reflectivity data at an inclination angle of 30 degrees in four directions of the horizontal/vertical directions are collected. One of the directions is the main viewing direction of the display panel, and not all four directions are required to have very high reflectivity.

As illustrated by FIG. 16C, a point light source is vertically incident from the center C0, and the outgoing light diverges and deviates. For the vertically incident light, a light spot is formed, and the light spot deviates to a bending direction of the rod-shaped structure of the scattering film. The scattering film can improve the reflectivity in the main viewing angle direction by about 300%, and greatly improve the reflectivity in the main viewing direction. For example, as illustrated by FIG. 16A, if the scattering unit is inclined to the lower left direction, the reflectivity and contrast ratio can be improved to the greatest extent when the main viewing direction is the lower left direction or the upper right direction.

Figure 17A:
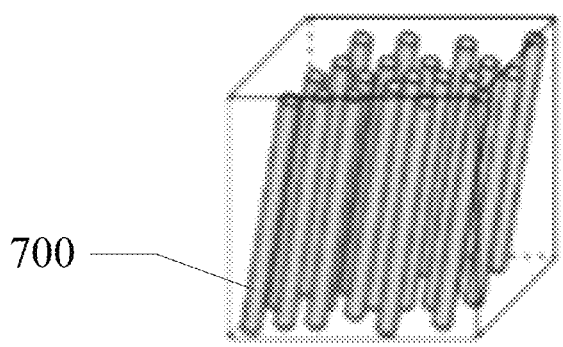
FIG. 17A is a schematic diagram of a scattering film of a display panel according to an embodiment of the present disclosure.
Figure 17B:
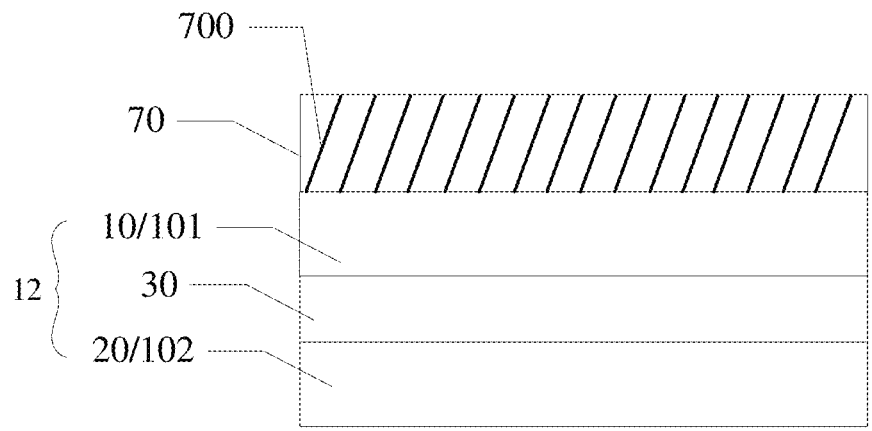
FIG. 17B is a schematic diagram of a display panel with a scattering film according to an embodiment of the present disclosure.

FIG. 17A is a schematic diagram of a scattering film of a display panel according to an embodiment of the present disclosure. FIG. 17B is a schematic diagram of a display panel with a scattering film according to an embodiment of the present disclosure. For example, as illustrated by FIG. 17A, the scattering film 70 includes a plurality of scattering units 700, each of which has a rod-like shape, that is, compared with the scattering unit 700 shown in FIG. 16A, the scattering unit 700 shown in FIG. 17A only includes the first portion, and the extending direction of the scattering unit 700 is the same as or opposite to the front view direction of the display panel. As illustrated by FIG. 17B, the included angle between the scattering unit 700 and the first base substrate 101 is an acute angle. For example, the acute angle is greater than 0 degrees and less than or equal to 15 degrees. Further, for example, the acute angle is greater than or equal to 5 degrees and less than or equal to 15 degrees.

For example, the scattering film 70 is a directional diffusion film (IDF), which can be used to increase the reflectivity in a certain direction.

For example, in the embodiment of the present disclosure, the front view direction is the direction in which the reflectivity of the display panel is maximum without providing with a scattering film. The direction of maximum reflectivity can be measured by experiment.

Figure 18:
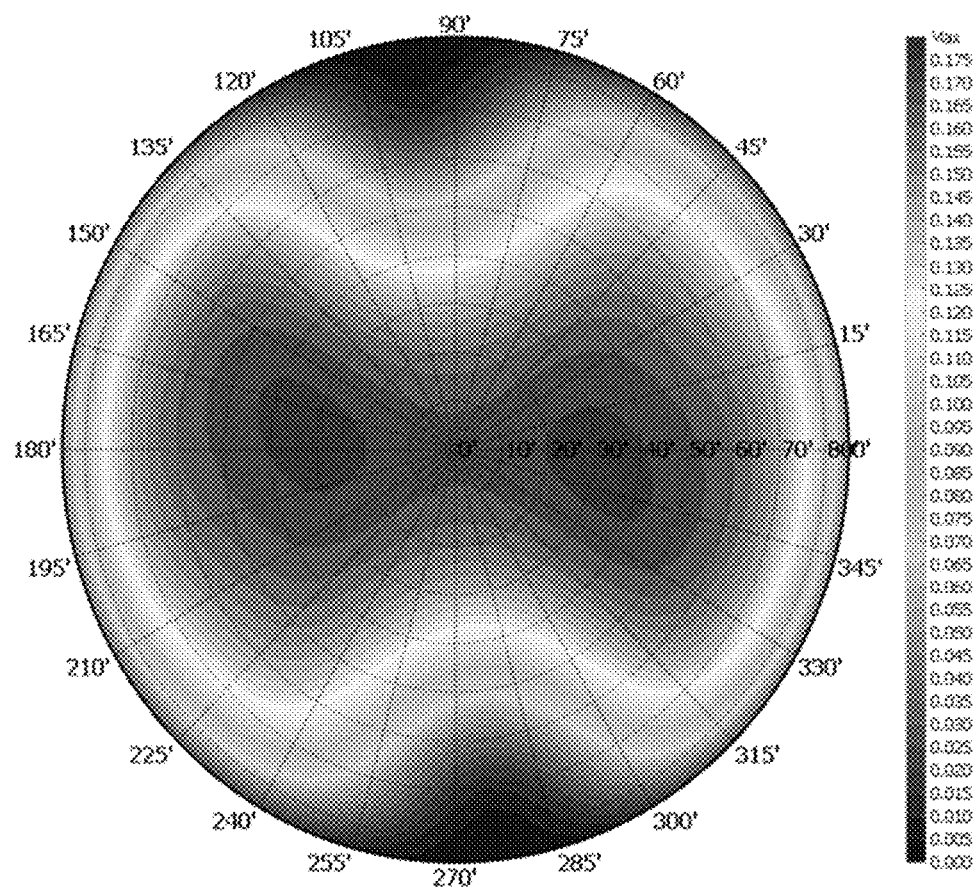
FIG. 18 is a simulation diagram of reflectivity distribution of a display panel according to an embodiment of the present disclosure.

FIG. 18 is a simulation diagram of reflectivity distribution of a display panel according to an embodiment of the present disclosure. FIG. 18 is a distribution diagram of reflectivity without providing with a scattering film. FIG. 18 is a schematic diagram of the measured reflectivity upon light being incident from different directions and received vertically. In FIG. 18, the peripheral numbers indicate azimuth angles, and the concentric circles indicate polarization angles. Given a point, the reflectivity of the display panel at that position can be obtained from the figure. As illustrated by FIG. 18, that display panel includes a direction in which the reflectivity is maximum. The darker the color in FIG. 18, the greater the reflectivity is.

Figure 19:
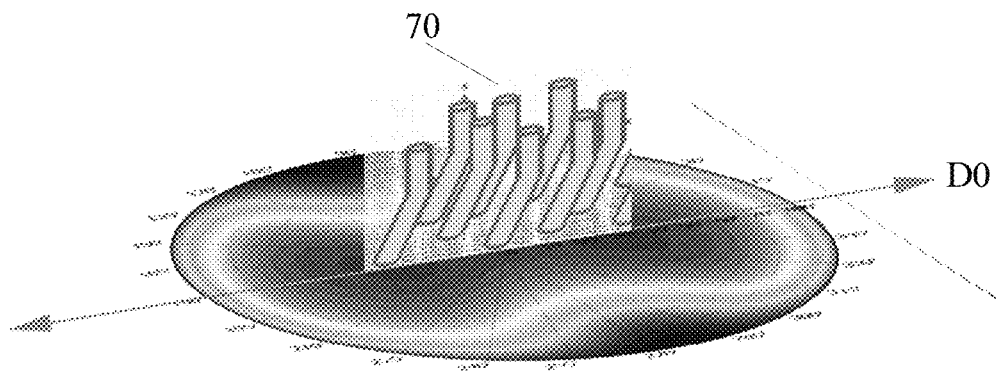
FIG. 19 is a schematic diagram of the matching of the scattering film with the maximum reflectivity direction of the display panel.

FIG. 19 is a schematic diagram of the matching of the scattering film with the maximum reflectivity direction of the display panel. As illustrated by FIG. 19, the bending direction of the scattering unit of the scattering film is the same as the reflectivity maximum direction D0 of the display panel. In the case where the scattering unit of the scattering film includes a single layer structure, the extending direction of the scattering unit of the scattering film is the same as the maximum reflectivity direction D0 of the display panel.

Figure 20:
FIG. 20 is a schematic diagram of a display panel according to an embodiment of the present disclosure.

FIG. 20 is a schematic diagram of a display panel according to an embodiment of the present disclosure. The display panel includes a first side 01, a second side 02, a third side 03 and a fourth side 04. The first side 01 is opposite to the second side 02, and the third side 03 is opposite to the fourth side 04. For example, the first side 01 is a side where an integrated circuit (IC) is disposed, that is, an IC side. The second side 02 is an IC opposite side. If the front view direction is the IC side, the IC opposite side is the opposite side of the front view direction, so that the IC side and the IC opposite side can correspond to the directions of 0 degrees and 180 degrees in FIG. 18, respectively. For example, upon the display panel being viewed from one side of the display panel, that side is the main viewing direction. The third side 03 and the fourth side 04 may be left and right sides of the display panel, respectively.

For example, the reflectivity distribution of the display panel is uneven in all directions, and there is a direction in which the reflectivity is the maximum reflectivity. If the demand of the main viewing direction changes, the center line of the included angle between the first alignment direction and the second alignment direction, the half-wave plate, the quarter-wave plate and the polarizer can be adjusted synchronously while keeping the angular relationship of the layers fixed, so that the related included angle is fixed within the abovementioned parameters and the maximum reflectivity direction turns to the main viewing direction.

The use of the scattering film can also improve the reflectivity of reflective display devices in a certain viewing angle direction. For example, the scattering film may be formed of a polymer material, but is not limited thereto. For example, the scattering film can adopt GBA, GCA or HDA, but is not limited thereto. The GBA, GCA or HDA represent the structure of the scattering film. In the GBA, GCA or HDA, the first letter represents the type of rod, G represents a single continuous bending rod; and H represents a single coherent straight rod; the second letter represents the angle of the next portion (the first portion of the scattering unit), B represents the next portion is inclined at 5 degrees, C represents the next portion is inclined at 10 degrees, and D represents the next portion is inclined at 15 degrees; the third letter represents single-layer film, which refers that all three scattering films are single-layer films composed of rod-like structural units. For example, in the case where GBA110/GCA110/GCA090/HDA060 is adopted as the scattering film, the reflectivity is improved most and includes better uniformity. Uniformity refers to the difference of reflectivity in different directions. The greater the value of uniformity, the better the uniformity is. The above scattering film is shown in the form of structure plus thickness, that is, the number behind GBA, GCA or HDA represents the thickness value, and the unit of thickness is micron. For example, in the case where GBA110 is used as the scattering film, the uniformity of reflectivity is 75%. For example, in the case where GCA110 is used as the scattering film, the reflectivity is 40% and the uniformity of reflectivity is 41%. For example, in the case where GCA090 is used as the scattering film, the reflectivity is 56% and the uniformity of reflectivity is 39%. For example, in the case where the scattering film is HDA060, the reflectivity is 70% and the uniformity of reflectivity is 24%.

For example, the scattering film provided by the embodiment of the present disclosure can be made by crystal growth or formed by ordinary methods. As long as the direction of the first portion of the scattering unit of the scattering film is orientating to the direction with the largest reflectivity upon attaching the scattering film, the reflectivity in the main viewing direction can be increased.

According to the display panel provided by the embodiment of the disclosure, at least ambient light is used as the light source, a natural light source or an artificial light source can be used as the light source, and the ambient light is reflected to realize display.

At least one embodiment of the present disclosure further provides a display device, including any one of the above-mentioned display panels. For example, the display device includes a reflective liquid crystal display device, which can be applied to display devices such as tablet computers, notebooks, mobile phones, smart watches, electronic picture frames, and electronic paper. For example, the display device can be applied to 32FHD (Full HD) and 4.95 inch reflective products, but is not limited thereto.

For clarity, the thickness of layers or areas in the accompanying drawings of the embodiments of the present disclosure is enlarged. It should be understood that when an element such as a layer, a film, an area or a substrate is referred to be disposed "on" or "beneath" another element, the element may be "directly" disposed "on" or "beneath" another element, or an intermediate element may be provided.

The embodiments of the present invention and the features in the embodiments may be mutually combined without conflict.

The foregoing is only the preferred embodiments of the present disclosure and not intended to limit the scope of protection of the present disclosure. Any change or replacement that may be easily thought of by those skilled in the art within the technical scope disclosed by the present disclosure shall fall within the scope of protection of the present disclosure. Therefore, the scope of protection of the present disclosure shall be defined by the appended claims.

The invention claimed is:

1. A display panel, comprising:
a first base substrate;
a second base substrate, arranged opposite to the first base substrate;
a liquid crystal layer, located between the first base substrate and the second base substrate;
a first alignment film, located at a side of the first base substrate facing the liquid crystal layer;
a second alignment film, located at a side of the second base substrate facing the liquid crystal layer;
a polarizer, located at a side of the first base substrate away from the liquid crystal layer; and
a quarter-wave plate, located between the polarizer and the first base substrate,
wherein the first alignment film has a first alignment direction, and the second alignment film has a second alignment direction,
an angle between a center line of an included angle between the first alignment direction and the second alignment direction and a slow axis of the quarter-wave plate is in a range from 75 to 105 degrees,
wherein an included angle between the first alignment direction and the second alignment direction is in a range from 48 to 58 degrees, or a range from 71 to 81 degrees.

2. The display panel according to claim 1, further comprising: a scattering film, wherein the scattering film is configured to scatter light incident thereon.

3. The display panel according to claim 1, further comprising: a half-wave plate located between the polarizer and the quarter-wave plate, wherein an included angle between a polarization direction of light emitted from the half-wave plate and the slow axis of the quarter-wave plate is in a range from 40 to 50 degrees.

4. The display panel according to claim 3, wherein an included angle between a transmission axis of the polarizer and a slow axis of the half-wave plate is in a range from 5 to 25 degrees or a range from 60 to 80 degrees.

5. The display panel according to claim 1, wherein the liquid crystal layer serves as a quarter-wave plate, and an included angle between a slow axis of the liquid crystal layer and the slow axis of the quarter-wave plate is in a range from 75 to 105 degrees.

6. The display panel according to claim 2, wherein the scattering film is located at a side of the first base substrate away from the liquid crystal layer.

7. The display panel according to claim 6, wherein the scattering film is located between the quarter-wave plate and the first base substrate.

8. The display panel according to claim 2, wherein the scattering film comprises a plurality of scattering units, each of the plurality of scattering units comprises a rod-like shape, and each of the plurality of scattering units comprises a first portion; an included angle between the first portion and the first base substrate is an acute angle, and an extending direction of the first portion is the same as a direction in which a reflectivity of the display panel is maximum without the scattering film.

9. A display panel, comprising:
a first base substrate;
a second base substrate, arranged opposite to the first base substrate;
a liquid crystal layer, located between the first base substrate and the second base substrate;
a first alignment film, located at a side of the first base substrate facing the liquid crystal layer;
a second alignment film, located at a side of the second base substrate facing the liquid crystal layer;
a polarizer, located at a side of the first base substrate away from the liquid crystal layer; and
a quarter-wave plate, located between the polarizer and the first base substrate,
wherein the first alignment film has a first alignment direction, and the second alignment film has a second alignment direction,
an angle between a center line of an included angle between the first alignment direction and the second alignment direction and a slow axis of the quarter-wave plate is in a range from 75 to 105 degrees,
the display panel further comprises: a scattering film, wherein the scattering film is configured to scatter light incident thereon,
wherein the scattering film comprises a plurality of scattering units, each of the plurality of scattering units comprises a rod-like shape, and each of the plurality of scattering units comprises a first portion; an included angle between the first portion and the first base substrate is an acute angle, and an extending direction of the first portion is the same as a direction in which a reflectivity of the display panel is maximum without the scattering film, wherein each of the plurality of scattering units further comprises a second portion, an included angle between the first portion and the second portion is greater than 90 degrees and less than 180 degrees, the first portion has a first section in a direction perpendicular to the first base substrate, the second portion has a second section in the direction perpendicular to the first base substrate, the first section is connected with the second section, an included angle between the first section and the direction perpendicular to the first base substrate is different from an included angle between the second section and direction perpendicular to the first base substrate, and the second section is provided on a side of the first section away from the first base substrate.

10. The display panel according to claim 9, wherein the first portion is closer to the first base substrate than the second portion, and an included angle between the second portion and the first base substrate is larger than the included angle between the first portion and the first base substrate.

11. The display panel according to claim 9, wherein the included angle between the second portion and the first base substrate is an acute angle or a right angle.

12. The display panel according to claim 11, wherein the acute angle is greater than 0 degree and less than or equal to 15 degrees.

13. A display panel, comprising:
a first base substrate;
a second base substrate, arranged opposite to the first base substrate;
a liquid crystal layer, located between the first base substrate and the second base substrate;
a first alignment film, located at a side of the first base substrate facing the liquid crystal layer;
a second alignment film, located at a side of the second base substrate facing the liquid crystal layer;
a polarizer, located at a side of the first base substrate away from the liquid crystal layer; and
a quarter-wave plate, located between the polarizer and the first base substrate,
wherein the first alignment film has a first alignment direction, and the second alignment film has a second alignment direction,
an angle between a center line of an included angle between the first alignment direction and the second alignment direction and a slow axis of the quarter-wave plate is in a range from 75 to 105 degrees,
the display panel further comprises: a scattering film, wherein the scattering film is configured to scatter light incident thereon,
wherein the scattering film comprises a scattering structure and a reflective element, the scattering structure and the reflective element are located on the second base substrate, the scattering structure comprises a plurality of protrusions and recessed portions located between adjacent ones of the plurality of protrusions, the scattering structure is located at a side of the second base substrate facing the first base substrate, and the reflective element is located at a side of the scattering structure away from the second base substrate, and is conformally formed on a surface of the scattering structure away from the second base substrate.

14. The display panel according to claim 1, further comprising: a reflective element, wherein the reflective element is located at a side of the second base substrate facing the liquid crystal layer, and the reflective element is configured to reflect light incident thereon.

15. The display panel according to claim 14, further comprising a first electrode on the first base substrate and a second electrode on the second base substrate, wherein the first electrode and the second electrode are configured to form an electric field to drive liquid crystal molecules in the liquid crystal layer to rotate.

16. The display panel according to claim 15, wherein the second electrode is also used as the reflective element.

17. A display device, comprising the display panel according to claim 1.

* * * * *